United States Patent
Shimizu

(10) Patent No.: US 6,862,306 B2
(45) Date of Patent: Mar. 1, 2005

(54) DRIVING CIRCUIT FOR LIGHT EMITTING ELEMENT, AND OPTICAL COMMUNICATION DEVICE USING SAME

(75) Inventor: Takayuki Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 140 days.

(21) Appl. No.: 10/315,986

(22) Filed: Dec. 11, 2002

(65) Prior Publication Data

US 2003/0107333 A1 Jun. 12, 2003

(30) Foreign Application Priority Data

Dec. 11, 2001 (JP) ........................................ 2001-377114
Nov. 29, 2002 (JP) ........................................ 2002-348847

(51) Int. Cl.[7] ................................................ H01S 3/00
(52) U.S. Cl. .................................. 372/38.02; 372/38.1
(58) Field of Search .......................... 372/38.1–38.02, 372/38.07

(56) References Cited

U.S. PATENT DOCUMENTS

| | | | | |
|---|---|---|---|---|
| 4,036,117 A | * | 7/1977 | Davies et al. ............... | 493/169 |
| 4,063,117 A | * | 12/1977 | Laugesen et al. ............ | 326/88 |
| 4,622,477 A | * | 11/1986 | Uda ........................... | 327/109 |
| 5,583,621 A | * | 12/1996 | Narukawa ................... | 399/58 |
| 6,256,329 B1 | * | 7/2001 | Ishizuka et al. ............ | 372/38.02 |
| 6,538,418 B2 | * | 3/2003 | Miyazaki ................... | 323/284 |

FOREIGN PATENT DOCUMENTS

JP 4-64216 B2 10/1992

* cited by examiner

*Primary Examiner*—Minsun Oh Harvey
*Assistant Examiner*—Phillip Nguyen
(74) *Attorney, Agent, or Firm*—Birch, Stewart, Kolasch & Birch, LLP

(57) ABSTRACT

A delay circuit delays an input signal. Further, a level shift circuit, which has a variable level shift amount, is provided between the delay circuit and an OR circuit, thereby making it possible to adjust a time during which a logic of active of the delayed signal is kept. Moreover, the OR circuit performs an OR operation of the input signal and an output signal of the level shift circuit so as to obtain a signal of an OR logic, which drives a light emitting element. With this arrangement, the level shift amount is adjusted in response to a control signal externally supplied, in an optical transmitter arranged such that the input signal and output light emitted from the light emitting element with a delay in the emission, have the equal duty ratio. In this way, property unevenness among finished products of the light emitting element is cancelled out. Thus, it is possible to drive the light emitting element at a higher speed.

12 Claims, 9 Drawing Sheets

DRIVING CIRCUIT FOR LIGHT EMITTING ELEMENT, AND OPTICAL COMMUNICATION DEVICE USING SAME

FIELD OF THE INVENTION

The present invention relates to a driving circuit for a light emitting element for use in an optical communication and in recording/reproduction of an optical recording medium, especially to a driving circuit for a light emitting element that is suitably used for short distance data communication using a light emitting element having a large delay in the light emission, and an optical communication device using the same.

BACKGROUND OF THE INVENTION

FIG. 7 is a block diagram illustrating an electric arrangement of an optical transmitter 1, which is a typical driving circuit in the prior art. The optical transmitter 1 is shown in FIG. 9 of Japanese Publication of Patent, Tokukouhei, No. 4-64216 (published on Oct. 14, 1992). The optical transmitter 1 drives a light emitting element 2, which is a semiconductor laser or a light emitting diode. An input signal s1 is supplied from a signal source 3 to a buffer amplifier 4, which amplifies a difference between the input signal s1 and a reference voltage vref1, which are inputted into the buffer amplifier 4. One input terminal of an OR circuit 5 directly receives an output signal s2 of the buffer amplifier 4, while the other input terminal of the OR circuit 5 receives a signal s2d, which is generated by delaying the output signal s2 by means of a low-pass filter constituted of a resistor r and a capacitor c. Therefore, the OR circuit 5 outputs a driving output s3 during a period in which at least one of the signals s2 and s2d is higher than a predetermined reference voltage vref2 (not shown).

The OR circuit 5 also generates a differential output s3a which is inversion of the driving output s3. The outputs s3 and s3a are respectively supplied to bases of transistors q1 and q2, which composes a differential current driver. Emitters of the transistors q1 and q2 are equally grounded via a constant current source 6. A collector of the transistor q1 is connected, via the light emitting element 2, to a power source line of a high level Vcc, while a collector of the transistor q2 is directly connected to the power source line of the high level Vcc. With this arrangement, the transistor q1 is turned ON only during the period in which the output signal s2 corresponding to the input signal s1, and the delay signal s2d are higher than the reference voltage vref2. Thereby, the light emitting element 2 is turned ON so as to emit output light pho, when a collector current i of the transistor q1 exceeds an oscillation threshold value ith, in case where the light emitting element 2 is a semiconductor laser.

FIG. 8 is a waveform chart explaining an operation of the optical transmitter 1 having the aforementioned arrangement. Assuming that delay time caused by the buffer amplifier 4 is negligibly small, the output signal s2 of the buffer amplifier 4 has a duty ratio of 50%, for example, when the input signal s1 received by the buffer amplifier 4 has a duty ratio of 50% and an average value that is equal to the reference voltage vref1. When the output signal s2 is delayed by the low-pass filter composed of the resistor r and the capacitor c, the output signal s2d, which rises and falls gently with a certain time constant, is outputted. When an OR operation of the signals s2 and s2d is carried out, a voltage pulse having a duty ratio greater than that of the input signal s1 is outputted as the driving output s3. Further, delayed rise of the light emitting element 2 gives the output light pho an actual duty ratio smaller than that of the driving output s3.

Here, FIG. 9 shows a relationship between a driving current iLD and an optical output pLD, in case where the light emitting element 2 is a semiconductor laser. The semiconductor laser has such a non-linear property that laser oscillation is started when the driving current iLD exceeds the oscillation threshold value ith, thereby suddenly increasing a power of the optical output pLD so as to start the emission of the light from the laser.

Moreover, FIG. 10 shows a relationship between a driving current iLED and an optical output pLED, in case where the light emitting element 2 is a light emitting diode. In the light emitting diode, the optical output pLED increases in proportion to the driving current iLED. However, when the increase of the optical output pLED reaches a certain level, a rate of the increase is decreased.

As described above, in either cases, there is a delay between a time at which the light emitting element 2 is started to drive, and a time at which the light emitting element 2 reaches a predetermined luminance level. Because of this, the output light pho has an actual duty ratio lower than that of the driving output s3.

For this reason, the prior art requires such an arrangement in which the low-pass filter is provided for giving the input signal s1 a large duty ratio so as to adjust a time constant thereof, thereby obtaining the output light pho having the duty ratio (of 50% in FIG. 8, as described above) equal to that of the input signal s1.

Here, the above arrangement will be explained in more detail. The time constant of the low-pass filter determines how much the duty ratio of the driving output s3 increases with respect to the duty ratio of the input signal s1. Moreover, the time constant of the low-pass filter is so adjusted that the time constant can cancel out the reduction in the duty ratio of the output light pho with respect to the duty ratio of the driving output s3. With this arrangement, it is possible to obtain the output light pho having the duty ratio (of 50% in FIG. 8, as described above) equal to the input signal s1.

However, finished products of the light emitting element 2 have production unevenness among them in terms of its light emission delay time (a length of time of the delay in the light emission). Therefore, the light emission delay time is measured for each light emitting element 2 to use, so as to adjust the time constant of the low-pass filter.

In such prior art, the duty ratio of the actual output light pho is adjusted to be equal to that of the input signal s1. However, only an cutoff frequency ($fc=1/(2\pi rc)$) determines a compensation amount of a pulse width of the output light pho (how much the pulse width of the output light pho is to be compensated). Therefore, in case where the low-pass filter is integrated on the integrated circuit, there is a drawback that the compensation amount cannot be adjusted. Especially, a difference between the duty ratios becomes unignoring when the input signal s1 has a high frequency.

The following will explain how the frequency of the input signal s1 relates to the duty ratio, by discussing an example arrangement in which the light emitting element 2 has a delay of 500 psec so that the delay cannot be compensated. As an example where the input signal s1 has a low frequency, assume that a transmission rate is 250 Mbps, the input signal s1 has the duty ratio of 50%, a pulse width of 4 nsec, and a pulse cycle of 8 nsec. In this case, the output light pho has a pulse width of 3.5 nsec, and a duty ratio of 43.75%. On the other hand, even with the same arrangement (in which the delay of the light emitting element 2 is 500 psec), when the input signal s1 has such a high frequency whereby the transmission rate is 500 Mbps, and the input signal s1 has the duty ratio of 50%, a pulse width of 2 nsec, and a pulse cycle of 4 nsec, the output light pho has the pulse width of 1.5 nsec and the duty ratio of 37.5%.

Therefore, if the adjustment of the compensation amount is impossible as previously discussed, it is a problem that an optical communication apparatus of higher speed cannot be realized without deteriorating its yield. Moreover, if a resistor r or a capacitor c of the low-pass filter for the adjustment of the compensation amount is mounted externally on the integrated circuit, a line for the signal s2 is exposed out of the integrated circuit, thus being more susceptible to disturbance noise. Thus, this arrangement has a poor jitter property of the signals. Furthermore, in order to increase the compensation amount, the low pass filter needs to have a large time constant. However, it is a drawback that such large time constant makes the jitter larger because the jitter depends on signal frequencies.

SUMMARY OF THE INVENTION

The present invention has an object of providing a driving circuit for a light emitting element, the driving circuit being capable of driving the light emitting element at a higher speed, and an optical communication device using the same.

In order to attain the above object, a driving circuit for a light emitting element of the present invention is provided with; a delay circuit for delaying an input signal; an arithmetic circuit for performing an OR operation of the input signal and a delay signal so as to obtain a signal of an OR logic, in order that the light emitting element is driven by using the signal of the OR logic so that an output light, which is emitted with a delay from the light emitting element, and the input signal have an equal duty ratio; and a level shift circuit, located between the delay circuit and the arithmetic circuit, for level shifting with a variable level shift amount, and adjusting a time during which a logic of the delay signal is kept.

With the above arrangement, it is possible to adjust, in accordance with a delay time of each light emitting element, a time during which the delay signal is active. Because of this, it is possible to externally optimize the duty ratio of the output light from the outside of the circuit, and to increase the compensation amount of the distortion of the pulse width. Moreover, the delay circuit does not requires such a large time constant. Thus, for realizing the delay circuit that is a low pass filter, no capacitance need be externally mounted. Thereby, the delay circuit have a low susceptibility to disturbance noise. Further, it is possible to suppress jitter that depends on signal frequencies. Therefore, this arrangement realizes high-speed optical transmission and optical recording/reproduction at a low cost, especially even if the light emitting element is a light emitting diode having a large distortion of the pulse width.

Moreover, the driving circuit for the light emitting element of the present invention, in order to attain the above object, is provided with a delay circuit for delaying an input signal and outputting an output signal; a level shift circuit for level shifting the output signal of the delay circuit, and outputting an output signal; and a driving circuit for driving the light emitting element by using a signal of an OR logic obtained by an OR operation of the output signals of the level shift circuit and the input signal.

With this arrangement, it is possible to compensate the distortion of the pulse width of the output light of the light emitting element with respect to the input signal, by using not only the delay amount of the input signal caused by the delay circuit, but also the level shift amount of the level shift circuit. Further, when compared with an arrangement in which the compensation is carried out only by the delay circuit, the above arrangement attains reduction of the time constant of the delay circuit, where both the arrangement can ensure the same compensation amount. The reduction of the time constant of the delay circuit suppresses the jitter that depends on signal frequencies. Thus, this arrangement can realize, at a low cost, a higher-speed optical transmission or optical recording/reproduction, especially even if the light emitting element is a light emitting diode having a large distortion of the pulse width. Especially, in case the level shift amount of the level shift circuit is externally adjustable, whereby property unevenness among finished products of the light emitting element can be cancelled out in response to an external control signal, this arrangement realizes a higher-speed optical transmission or optical recording/reproduction with a low cost.

In addition to the above arrangement, the driving circuit for the light emitting element may be further provided with a feedback circuit for controlling the level shift amount of the level shift circuit so that the output light and the input signal have an equal duty ratio.

With the above arrangement, it is possible to stably obtain the output light having the duty ratio equal to that of the input signal always.

For a fuller understanding of the nature and advantages of the invention, reference should be made to the ensuing detailed description taken in conjunction with the accompanying drawings.

DESCRIPTION OF THE EMBODIMENTS

Described below is an embodiment of the present invention, with reference to FIGS. 1 to 4.

Figure 1:
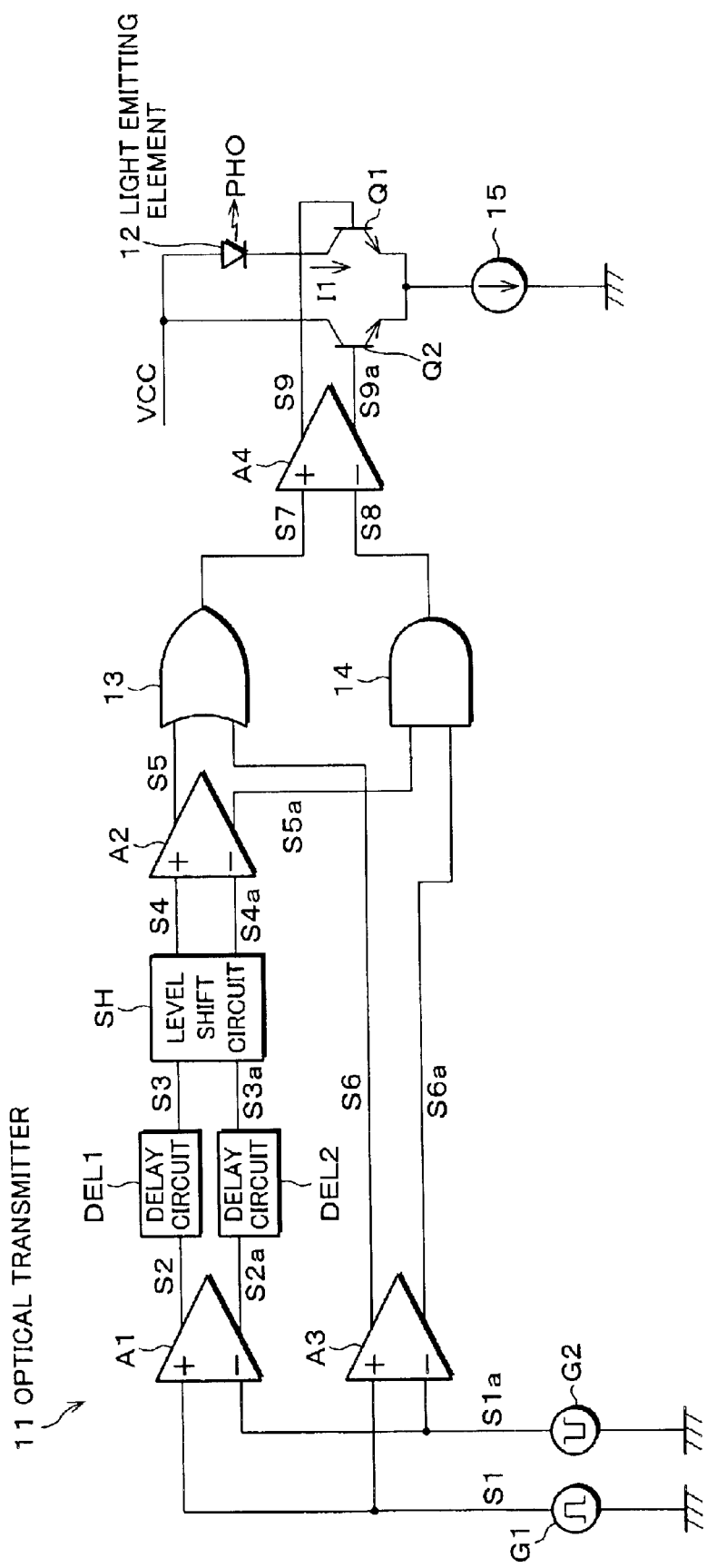
FIG. 1 is a block diagram illustrating an electrical arrangement of an optical transmitter, which is a driving circuit of an embodiment of the present invention.

FIG. 1 is a block diagram illustrating an electric arrangement of an optical transmitter 11, which is a driving circuit of an embodiment of the present invention. The optical transmitter 11 is suitable as an optical communication device for use in a system (so called OP iLINK) in which, instead of a metal wire, an optical fiber is used as a transmission line, which a physical layer in conformity with IEEE1394-1995 and IEEE1394a-2000. Moreover, the optical transmitter 11, which is capable of driving a semiconductor laser or a light emitting diode as a light emitting element 12, is especially suitable for driving a light emitting diode that emits light with a large delay.

Signal sources G1 and G2 respectively outputs differential input signals S1 and S1a suitable for high-speed transmission. The input signals S1 and S1a are supplied to a buffer amplifier A1 for amplifying the difference between the input signals S1 and S1a. Differential output signals S2 and S2a of the buffer amplifier A1 are respectively delayed to be differential signals S3 and S3a by delay circuits DEL1 and DEL2, which are respectively realized by a low-pass filter or the like described later. The differential signals S3 and S3a are supplied to a level shift circuit SH thereafter.

The level shift circuit SH generates a pair of signals S4 and S4a by so level shifting the signals S3 and S3a as to cause the signals S3 and S3a to have a high level side voltage and a low level side voltage having different amounts, with respect to a central voltage Vref1 (not shown) as a reference voltage for example. Then, the level shift circuit SH outputs the pair of signals S4 and S4a to the amplifier A2. The amplifier A2 compares the thus level shifted signals S4 and S4a, and outputs differential signals S5 and S5a. After levels of the signals S4 and S4a are switched over, the differential signals S5 and S5a start level change.

On the other hand, the input signals S1 and S1a are divided into two signal lines respectively. The input signals S1 and S1a are also supplied to a buffer amplifier A3, which is equivalent to the buffer amplifier A1. The buffer amplifier A3 generates differential output signals S6 and S6a, which are equivalent to the output signal S2 and S2a.

Further, the signal S5, which is a positive-phase output of the amplifier A2, and the signal S6, which is a positive-phase output of the buffer amplifier A3, are supplied to an OR circuit 13, which performs an OR operation of the signals S5 and S6. Moreover, the signal S5a, which is an inversion output of the amplifier A2, and the signal S6a, which is an inversion output of the buffer amplifier A3, are supplied to an AND circuit 14, which performs an AND operation of the signals S5a and S6a.

The OR circuit 13 outputs an output signal S7 while the AND circuit 14 outputs an output signal S8. The output signals S7 and S8, which are differential signals, are supplied to an amplifier A4, which compares the output signals S7 and S8. The amplifier A4 outputs differential output signals S9 and S9a, which are respectively supplied to bases of transistors Q1 and Q2, which compose a differential current driver. Both emitters of the transistors Q1 and Q2 are grounded via a constant current source 15. A collector of the transistor Q1 is, connected to a power source line of a high level Vcc, via the light emitting element 12, meanwhile a collector of the transistor Q2 is connected to a power source line of a high level Vcc directly.

With this arrangement, the transistor Q1 is turned ON only during a period in which the output signal S9 of the positive-phase is at the high level, whereby a modulated pulse current caused by such switching operation flows to the light emitting element 12. In case the light emitting element 12 is a semiconductor laser, the light emitting element 12 is turned ON when a collector current I1 of the transistor Q1 exceeds an oscillation threshold value Ith, thereby outputting output light PHO.

Figure 2:
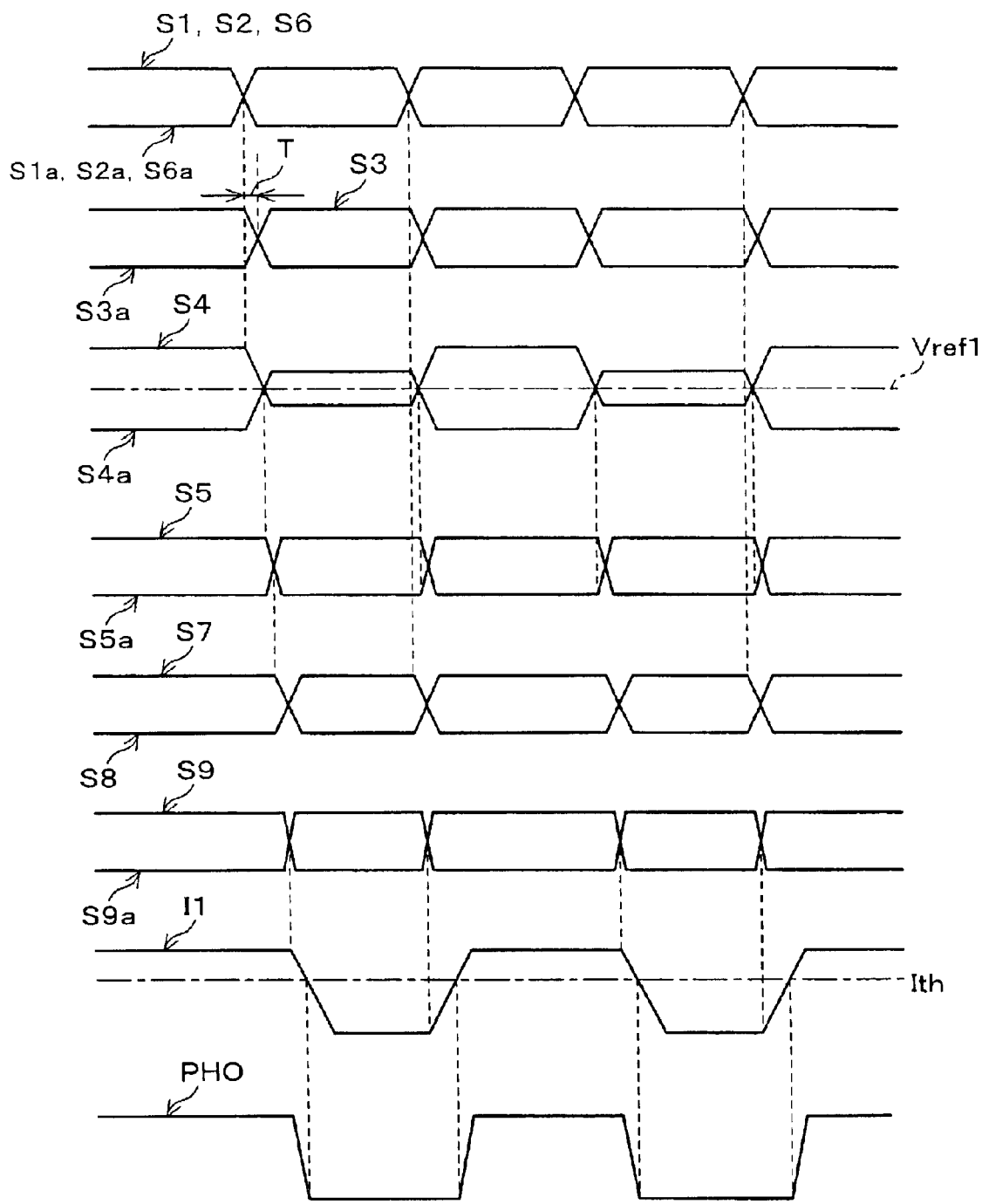
FIG. 2 is a waveform chart explaining an operation of the optical transmitter shown in FIG. 1.

FIG. 2 is a waveform chart explaining an operation of the optical transmitter 11 having the aforementioned arrangement. It is assumed that the input signals S1 and S1a have rectangular waves having a duty ratio of 50%, and a delay in signal transmission of the buffer amplifiers A1 and A3 are negligible. The delay circuit DEL1 and DEL 2 output the signals S3 and S3a, which are delayed from the input signals S1 and S1a by a predetermined time T. The output signals S3 and S3a of the delay circuits DEL1 and DEL2 usually have a rise time and a decay time, which are finite. Therefore, the level shift circuit SH level shifts DC levels of the output signals S3 and S3a to be equal to those of the signals S4 and S4a. Then, the amplifier A2 compares the signals S4 and S4a outputted from the level shift circuit SH. In this way, the output signals S5 and S5a from the amplifier A2 are delayed from the input signals S1 and S1a, thereby having waveforms having different duty ratios.

More specifically, the output signals S3 and S3a of the delay circuits DELL and DEL2 usually have a rise time and decay time, which are finite. Therefore, at a time point at which one of the signals S4 and S4a, which has been larger than the other, becomes smaller, and the other of the signals S4 and S4a, which has been smaller than the one, becomes larger, (at a time point at which output signals S5 and S5a of the amplifier A2 are varied) is varied as much as the shift amount caused by the level shift circuit SH, compared with at a time point at which one of the signals S3 and S3a, which has been larger than the other, becomes smaller, and the other of the signals S3 and S3a, which has been smaller than the one, becomes larger, the signals S4 and S4a being generated by level shifting the output signals S3 and S3a. Therefore, in comparison with a later-described arrangement, namely, an arrangement in which no level shift circuit SH is provided (an arrangement in which a buffer amplifier A2 compares signals S3 and S3a), the duty ratio of the output signals S5 and S5a of the buffer amplifier A2 is varied as much as a level shift amount (an amount of the level shifting) caused by the level shift circuit SH.

For example, when the level shift amount caused by the level shift SH is positive, the duty ratio of the signal S5, which is the positive-phase output of the amplifier A2 is increased. When the level shift amount is negative, the duty ratio of the signal S5 is decreased. Note that FIG. 2 shows an example where the level shift circuit SH level shifts the output signals S3 and S3a to have a large level. Thus, in FIG. 2, the signal S5 has a large duty ratio.

Therefore, among (a) the signals S5 and S5a, which have passed through the delay circuit DEL1 or DEL2, and the level shift circuit SH, and (b) the signals S6 and S6a, which are equal to the input signal S1 and S1a, the signals S5 and S6, which are the positive-phase outputs, are subjected to the OR operation, the signals S5a and S6a, which are the inversion outputs, are subjected to the AND operation, thereby obtaining a signal S9 having a voltage pulse having a duty ratio different from those of the input signals S1 and S1a.

Figure 3:
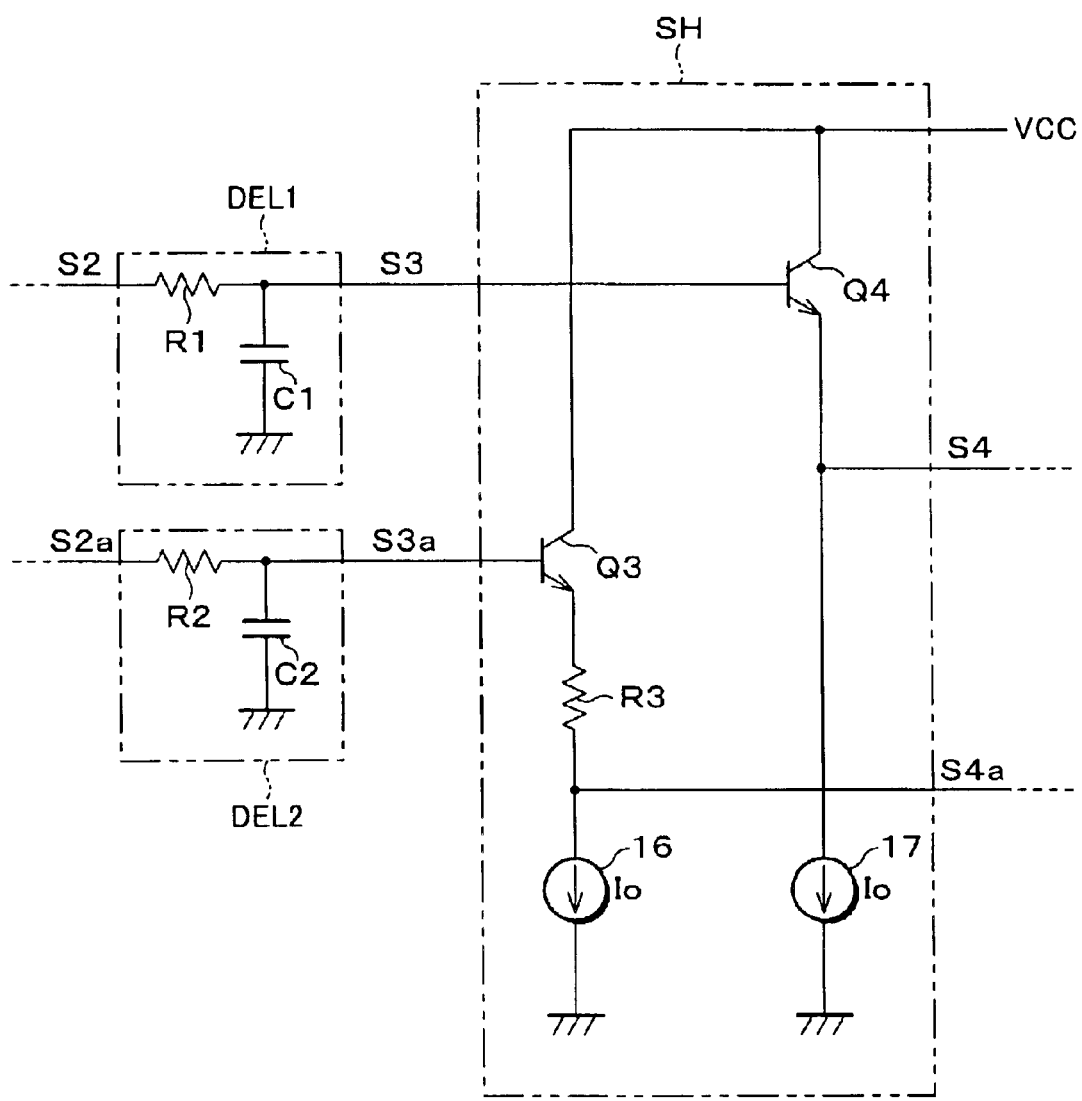
FIG. 3 is an electric circuit diagram illustrating an example arrangement of a delay circuit and a level shift circuit of the optical transmitter shown in FIG. 1.

FIG. 3 is an electrical circuit diagram illustrating an example arrangement of the delay circuits DEL1 and DEL2, and the level shift circuit SH. In this example arrangement, the delay circuits DEL1 and DEL2 are realized by providing low-pass filters respectively composed of resistors R1 and R2, and capacitors C1 and C2. It is possible to adjust a delay amount by arbitrarily setting values of the resistors R1 and R2, and those of the capacitors C1 and C2. Moreover, if the resistors R1 and R2, and the capacitors C1 and C2 are formed on an integrated circuit in order to perform a differential operation, the two low-pass filter is advantageously capable of generating a cut-off frequency with relatively high accuracy.

The level shift circuit SH is provided with transistors Q3 and Q4, a resistor R3, and constant current source 16 and 17. The transistor Q3, the resistor R3, and the constant current source 15 forms a serial circuit between the power source line of the high level Vcc and the grounding line. Meanwhile, the transistor Q4 and the constant current source 17 forms a serial circuit between the lines. Further, bases of the transistor Q4 and Q3 receive the signal S3 and S3a, respectively. From a node between the resistor R3 and constant current source 16, the signal S4a is outputted, while the signal S4 is outputted from a node between the transistor Q4 and the constant current source 17.

Therefore, the level shift amount of the level shift circuit SH is a voltage that is equal to a product of a resistivity of the resistor R3 and a current value of a current Io of the constant current source 16. Thus, an increase of the current Io increases the level shift amount, thereby increasing a later-described compensation amount of the pulse width. It is possible to adjust the level shift amount by externally adjusting values of the currents Io of the constant current sources 16 and 17. The level shift circuit SH is provided with the resistor R3 for level shifting only on a resistor inversion output side. This is because the resistor R3, which compensates the pulse width, is needed only for a direction to which a high level time of an applied current pulse is extended, because a time during which the applied current pulse is of the high level is shorter than a time during which the light emitting element 12 is emitting light. This attains an arrangement with a fewer circuit elements.

Figure 4:
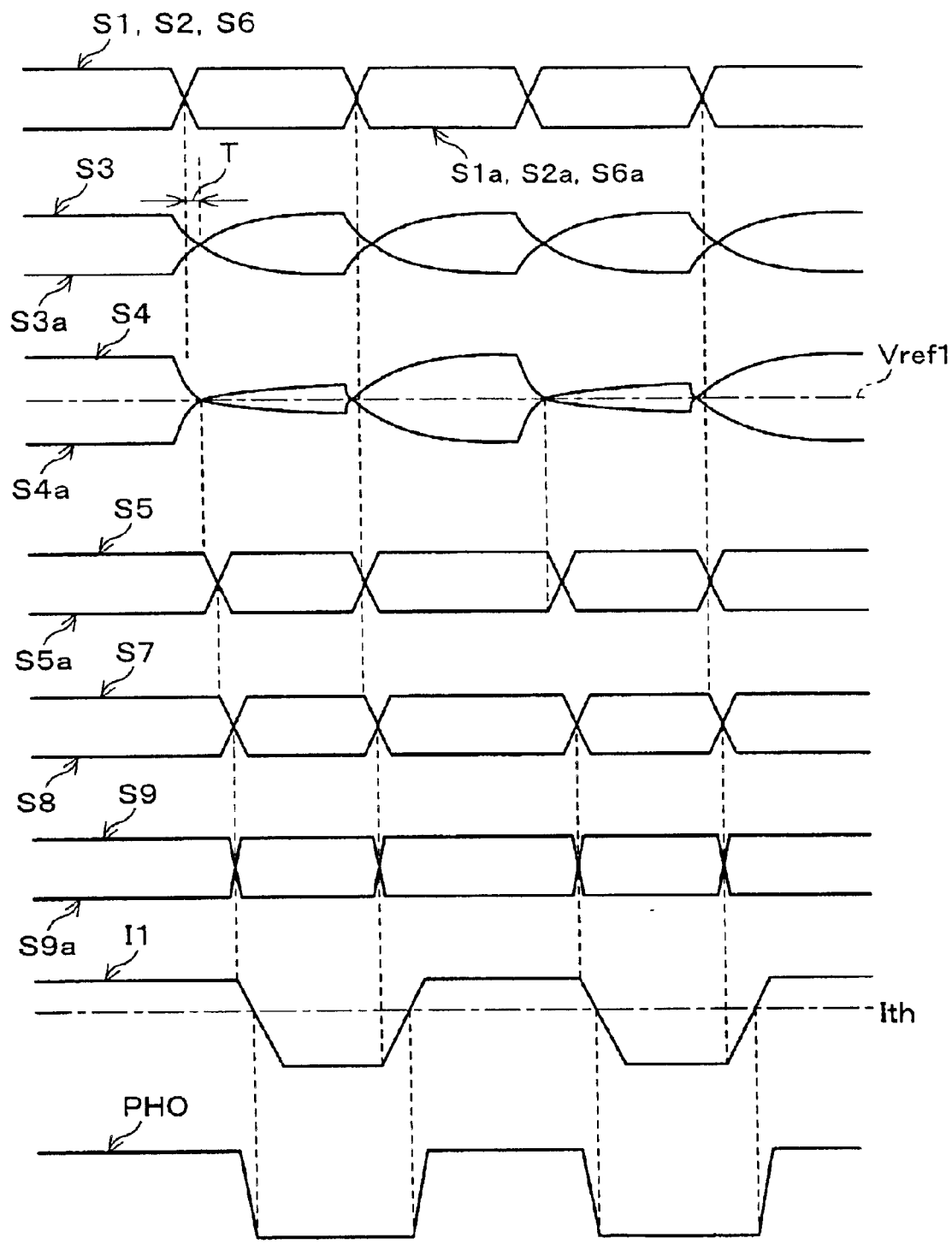
FIG. 4 is a waveform chart explaining an operation of the optical transmitter, when the level shift circuit shown in FIG. 3 is used.

FIG. 4 shows signal waveforms of the respective sections in case the low-pass filters are used as the delay circuits DEL1 and DEL2. Except the signals S3, D3a, S4, and S4a, the waveforms are similar to those in FIG. 2.

Figure 7:
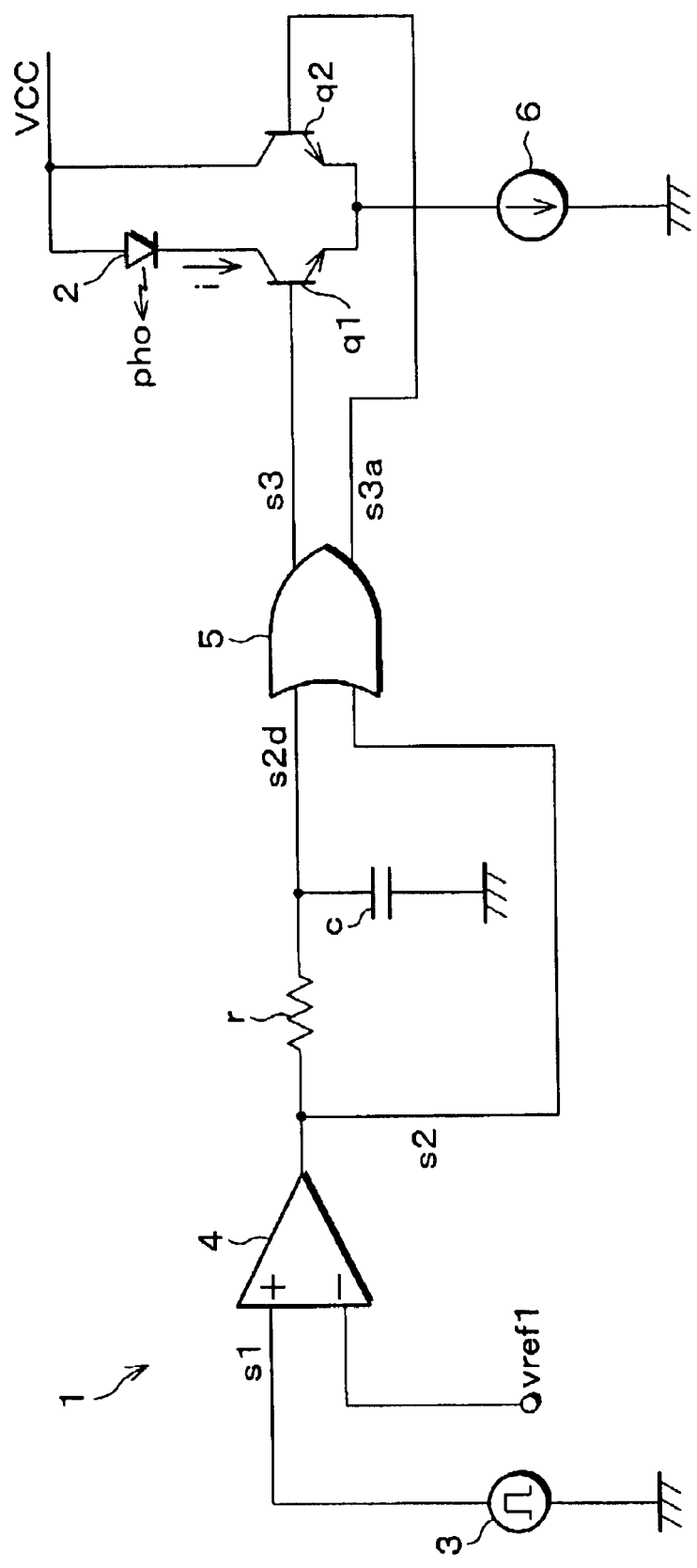
FIG. 7 is a block diagram illustrating an electric arrangement of an optical transmitter, which is a typical conventional driving circuit.
Figure 8:
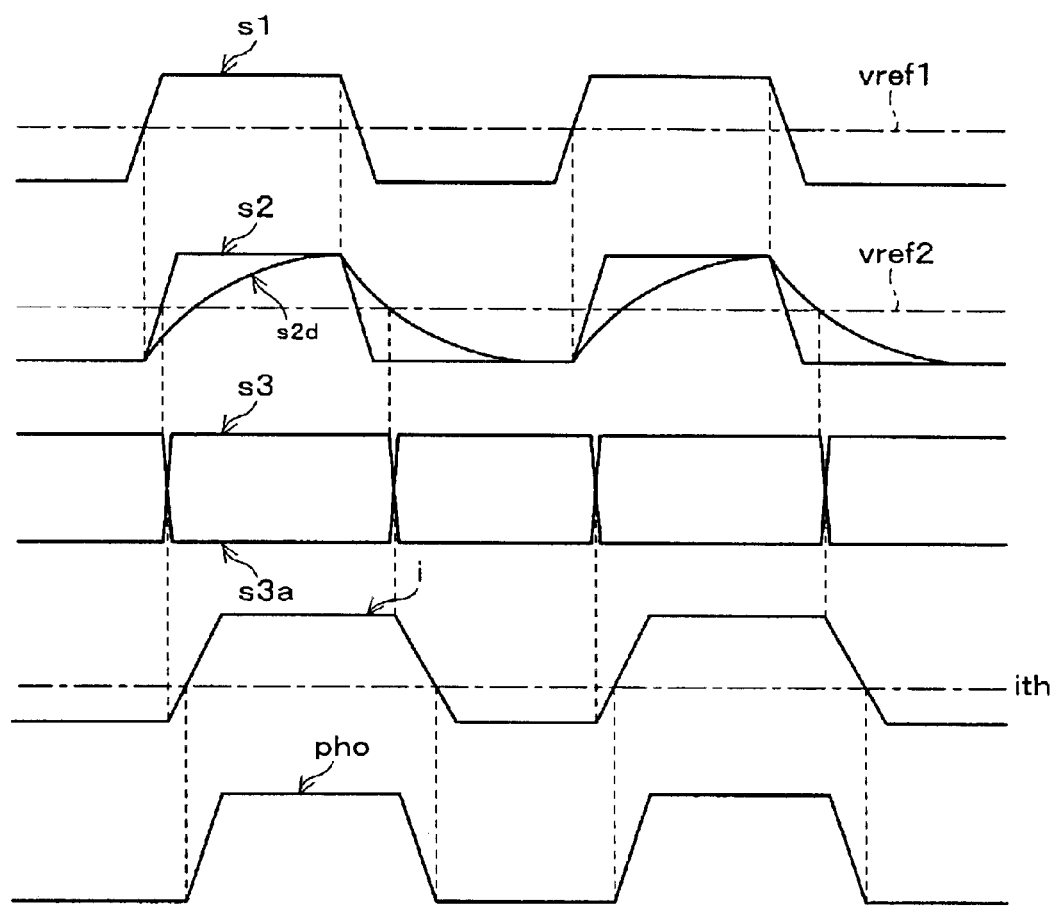
FIG. 8 is a waveform chart explaining an operation of the optical transmitter shown in FIG. 7.
Figure 9:
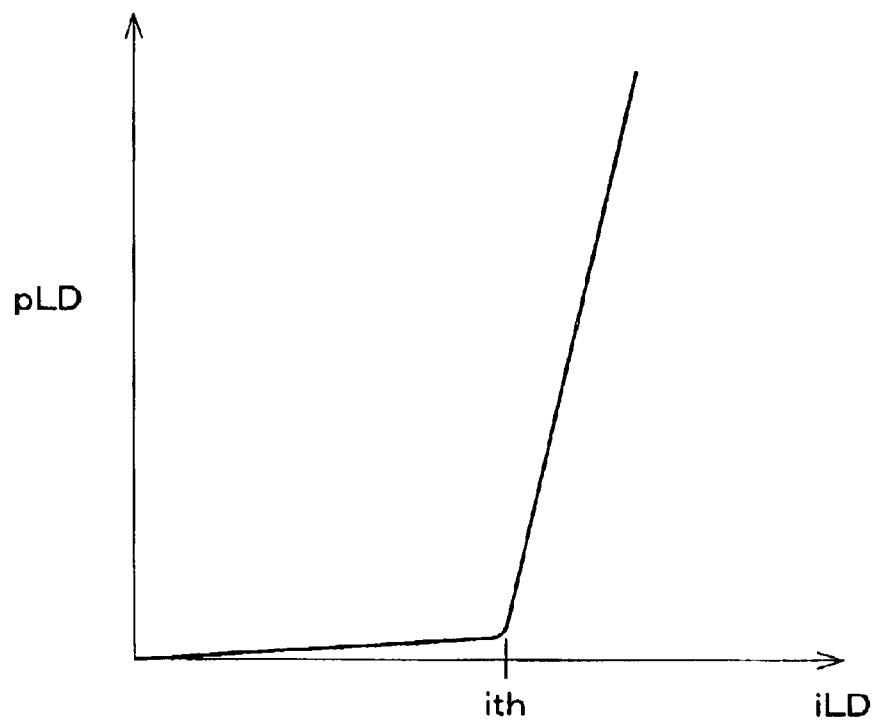
FIG. 9 is a graph showing a relationship between a driving current and an optical output in case a light emitting element is a semiconductor laser.
Figure 10:
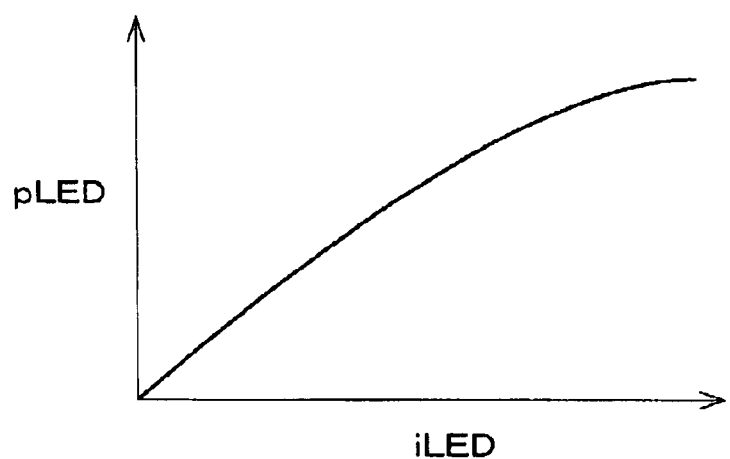
FIG. 10 is a graph showing a relationship between a driving current and an optical output in case a light emitting element is a light emitting diode.

It is apparent that a period in which the driving signal S9 of the light emitting element 12 is at the high level is compensated with a greater compensation amount, when it is so arranged that the level shift circuit SH is additionally provided together with the delay circuits realized by the low-pass filters, in comparison with the arrangement in which only the delay circuits realized by the low-pass filters are provided, as the conventional optical transmitter 1 is arranged. With the arrangement, when the delay circuits DEL1 and DEL2 have a constant delay time and the level shift circuit SH finely adjusts the level shift amount thereof by means of the external terminal as described above, it is therefore possible to realize a sufficient compensation of distortion of the pulse width which attains a fine adjustment of a length of the period during which the driving signal S9 of the light emitting element 12 is at the high level. Moreover, this arrangement does not require such a large time constant for the delay circuits DEL1 and DEL2, compared with the case where no level sifter circuit SH is provided and the distortion of the pulse width is compensated only by the time constant of the low pass filter (the arrangement of FIG. 7). Therefore, the capacitors C1 and C2 may be provided internally, so that the capacitors C1 and C2 are not susceptible to disturbance noise. Moreover, no need of the large time constant makes it possible to suppress jitter that depends on the signal frequencies. With this arrangement, it is possible to realize optical transmission of higher speed with a low cost, particularly even if the light emitting element 12 is a light emitting diode whose pulse width is largely distorted.

Described below is another embodiment of the present invention, with reference to FIGS. 5 and 6.

Figure 5:
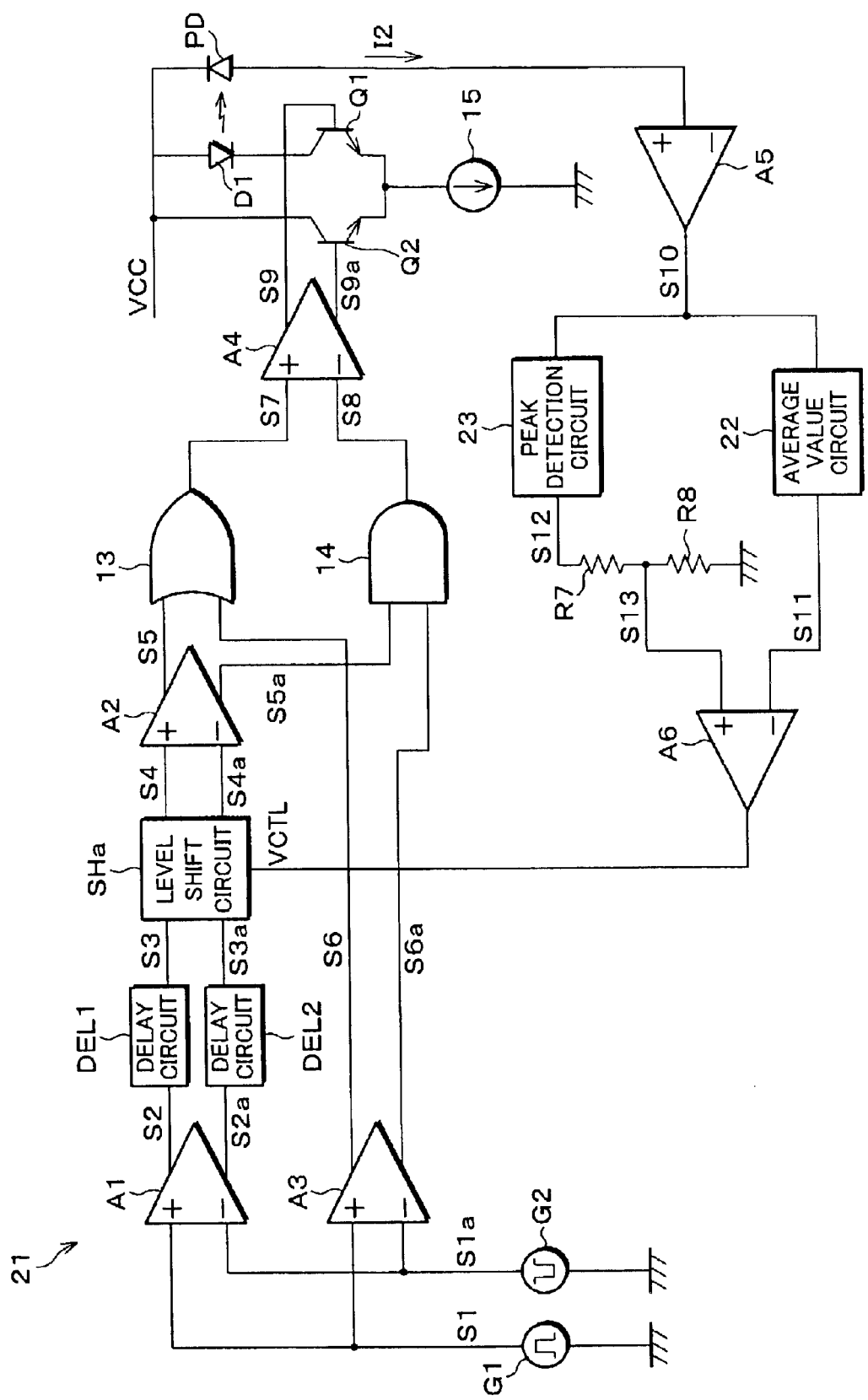
FIG. 5 is a block diagram illustrating an electric arrangement of an optical transmitter, which is a driving circuit of another embodiment of the present invention.

FIG. 5 is a block diagram illustrating an electric arrangement of an optical transmitter 21, which is a driving circuit of the another embodiment of the present invention. The optical transmitter 21 is similar to the above described optical transmitter 11. Thus, the optical transmitter 21 is labeled in the same manner as the optical transmitter 11 as to corresponding sections, and explanation of those section is omitted here. It should be noted that the optical transmitter 21 has such an arrangement that a duty ratio of output light PHO is detected and feedback to a level shift circuit SHa is carried out in order to vary a level shift amount of a level shift circuit SHa depending on a result of the detection (detection result). With this arrangement, a compensation amount of distortion of a pulse width is adjusted so as to stably keep the duty ratio of the output light PHO similar to duty ratios of input signals S1 and S1a.

In order to attain this arrangement, the optical transmitter 21 is provided with a light receiving element PD for monitoring a level of the output light from the light emitting element 12. The light receiving element PD outputs a current 12, which is in accordance with intensity of the output light PHO. The current 12 is converted to a voltage signal S11 by an trans impedance amplifier A5. The voltage signal S10 is supplied to an average value circuit 22, which detects out an average value of the voltage signal S10. A signal S1, whose voltage is at the average value, is supplied to an inversion input terminal of an amplifier A6. The voltage signal S10 is also supplied to a peak detection circuit 23, which holds the voltage signal S10 at its peak value and outputs a signal S12, whose voltage is at the peak value of the voltage signal S10. The signal S12 is divided by resistors R7 and R8, thereby generating a signal S13. The signal S13 is supplied to a non-inversion input of the amplifier A6. The amplifier A6 supplies to the level shifter circuit SHa a control signal VCTL which is at a level corresponding to a difference between the signal S13 and the signal S11, whose voltage is at the average value.

Figure 6:
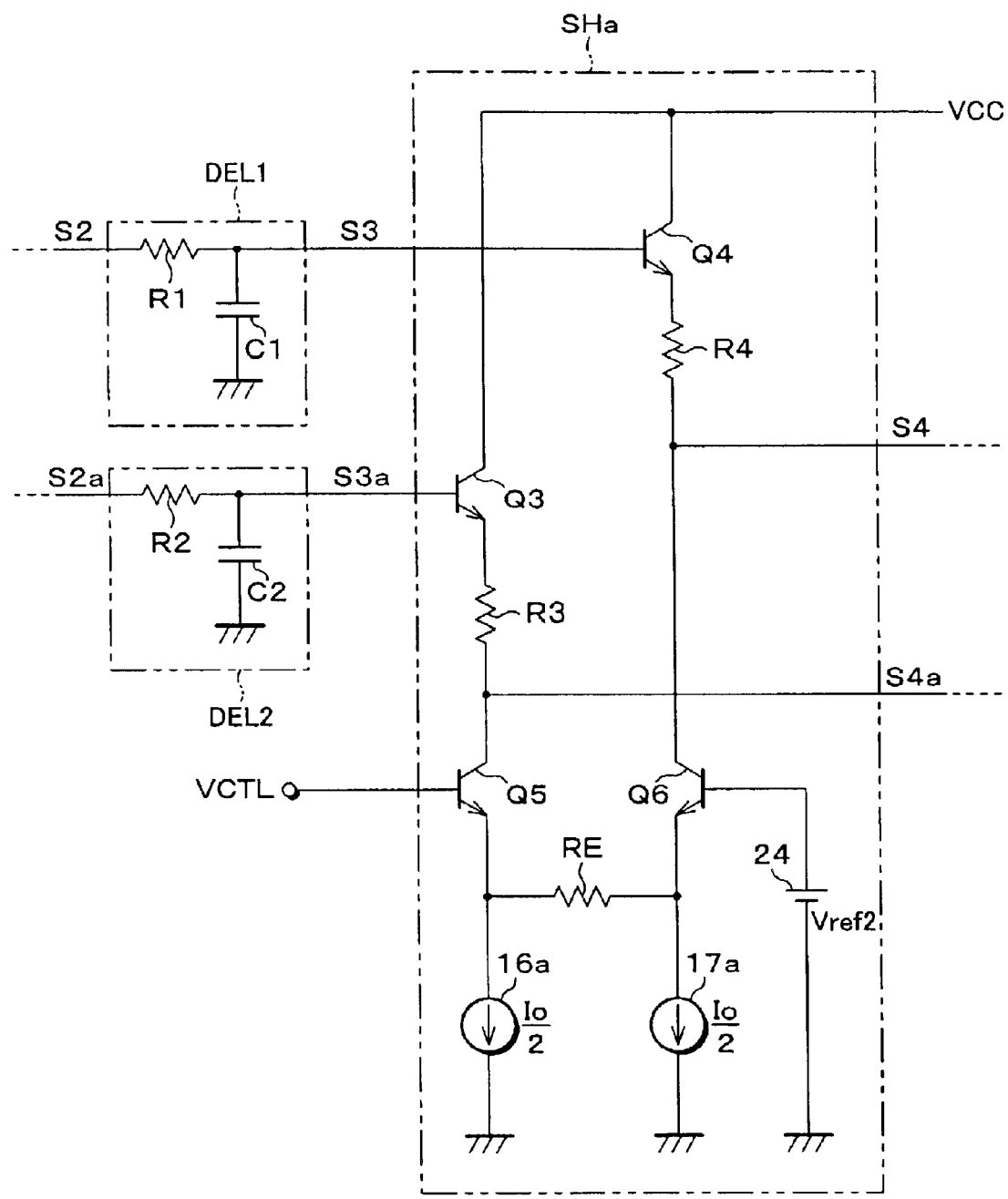
FIG. 6 is an electric circuit diagram showing an example arrangement of a delay circuit and a level shift circuit of the optical transmitter shown in FIG. 5.

FIG. 6 is an electric circuit diagram illustrating an example arrangement of the level shift circuit SHa. The level shift circuit SHa is labeled in the same manner as the level shift circuit SH as to corresponding sections. The level shift circuit SHa is provided with transistors Q5 and Q6, which compose a differential transconductance amplifier. More specifically, in the level shift circuit SHa, the transistor Q5 is located between a resistor R3 and a constant current source 16a. The transistor Q5 has a base to which the control signal VCTL is supplied. Moreover, the transistor Q6 and a resistor R4 are located between a transistor Q4 and a constant current source 17a. The transistor Q6 has a base to which a reference voltage Vref2 is supplied from a reference voltage source 24. Further, emitters of the transistors Q5 and Q6 are connected via a resistor RE. The constant current sources 16a and 17a supply currents Io/2. The signal S4 is outputted from a node between the resistor R4 and the transistor Q6.

Therefore, level shift circuits are provided respectively in a transmission route that leads to a positive-phase input and in a transmission route that leads to an inversion input of an amplifier A2. With this arrangement, it is possible to adjust a level shift amount of the level shift circuits, by varying a level of the control signal VCTL referring to the reference voltage Vref2. Moreover, a transconductance of the transconductance amplifier is varied by varying a value of the resistor RE. Thus, it is possible to arbitrarily set sensitivity of the compensation of the distortion of the pulse width of the input signals S1 and Sla, by varying the value of the resistor RE.

Therefore, the level of the control signal VCTL is so controlled as to make the signals S13 and S11 equal to each other, the signal S13 being generated by dividing the voltage of the peak value of the voltage signal S50 from the trans impedance amplifier A5. As a result, the output light PHO having a duty ratio always equal to those of the input signals S1 and S1a is obtained stably by setting the ratio of the resistor R7 to the resistor R8 to the duty ratios of the input signal S1 and S1a.

As described above, the level shift circuit SHa is provide with the resistor R4 for level shifting the delayed positive-phase input signal S3, and the resistor R3 for level shifting the delayed inversion signal S4. The signal S3 is level shifted only by a voltage equal to the product of a current value flowing through the resistor R4 and a resistance of the resistor R4. Meanwhile, the signal S3a is level shifted only by a voltage equal to the product of a current amount flowing through the resistor R3 and a resistance of the resistor R3. Further, the transconductance amplifier, which is provided with the transistors Q4 and Q5, and the resistor RE, controls the current value flowing through the respective resistors R3 and R4 in accordance with the control signal VCTL, which is externally supplied. With this arrangement, the level shift circuit SHa can adjust the level shift amount of the level shifting of the input signals S3 and S3a in accordance with the control signal VCTL. Further, by the value of the resistor RE between the emitters between the transistors Q4 and Q5, it is possible to arbitrarily set sensitivity of the compensation of the distortion of the pulse width of the input signals S1 and S1a.

Moreover, a circuit having the same arrangement as the level shift circuit SHa but having no resistor R4, is a circuit having the same arranged as the level shift circuit SH but enabling external adjustment of the value of the currents Io of the constant current sources 16 and 17. With this circuit, it is possible to control the level shift amount of the resistor R3 in accordance with the voltage of the control signal VCTL.

Specifically, by replacing the level shift circuit SH shown in FIG. 1 with the circuit having the same arrangement as the level shift circuit SHa but having no resistor R4, it is possible to realize a level shift circuit capable of adjusting the level shift amount in accordance with the voltage level of the control signal VCTL. Moreover, amounts of the currents Io of the constant current sources 16 and 17 may be adjusted in accordance with the output signal of the amplifier A6 by replacing the level shift circuit SHa shown in FIG. 5 with a circuit having the same arrangement as the level shift circuit SH shown in FIG. 3 but being further providing with a resistor R4 between the transistor Q4 and the constant current source 17 so as to output a signal S4 from a node between the resistor R4 and the constant current source 17. Either of the arrangements can attain an effect similar to that of the arrangement of FIG. 5, by varying a level shift amount the level shift circuit SHa in accordance with a detection result of detection of a duty ratio of output light.

In addition, if the buffer amplifier A1 has a sufficiently low output impedance and the later stages of the circuit (for example, the delay circuits DEL1 and DEL2, and the like) have a sufficiently high input impedance, the optical transmitters 11 and 12 may be so arranged that the buffer amplifier A3 is omitted therein and the signals S2 and S2a are used as the signals S6 and S6a. However, in case where the delay circuits DEL1 and DEL2 are the low-pass filters that give the output signals S2 and S2a of the buffer amplifier A1 a blunt rectangular waveform, the output signals S2 and S2a of the buffer amplifier A1 have a rise time and a decay time later than those of an arrangement in which no low-pass filter is provided. Therefore, it is preferable that the buffer amplifier A3 is provided therein.

Moreover, instead of the comparison between the differential signals S7 and S8, which are respectively from the OR circuit 13 and from the AND circuit 14, the amplifier A4 may be so arranged as to perform discrimination of one of the signals S7 and S8 in accordance with a reference level. In this case, it is possible to omit one of the OR circuit 13 and AND circuit 14 from the arrangement. However, the user of both the circuits 13 and 14 allows the amplifier A4 to deal with the signals as the differential signals. This is suitable for the aforementioned optical transmission of high speed.

As described above, a driving circuit for a light emitting element (12) of the present invention, including a delay circuit (DEL1 and DEL2) for delaying an input signal, an arithmetic circuit (the amplifier A4, OR circuit 13, and AND circuit 14) for performing an OR operation of the input signal and the delay signal so as to obtain a signal of an OR logic, the driving circuit driving the light emitting element (12) by using the signal of the OR logic, so that an output light, which is emitted with a delay from the light emitting element, and the input signal have an equal duty ratio, the driving circuit is provided with a level shift circuit (SH, SHa), located between the delay circuit and the arithmetic circuit, for level shifting with a variable level shift amount, and adjusting a time during which a logic of the delay signal is kept.

With the above arrangement, in order to compensate a phenomenon in which the output light has a duty ratio smaller than that of the input signal due to the delay in the light emission of the light emitting element when the light emitting element is driven for optical communication or recording/reproducing an optical recording medium, a driving circuit for a light emitting element, which is so arrange that the delay circuit, which is a low-pass filter or the like, delays the input signal, and the light emitting element is driven by a signal of an OR logic, which is obtained by an OR operation of the delay signal and the input signal (in case a signal of an AND logic is used, by an inversion signal thereof), thereby turning on the light emitting element by using the delay signal even if the input signal turned to be inactive, is provided with a level shift circuit, located between the delay circuit and the arithmetic circuit, for level shifting a variable level shift amount, and adjusting a time during which a logic of the delay signal is kept.

With the arrangement, in which the light emitting signal is driven by using the signal of the OR logic obtained by the OR operation of the delay signal and the input signal, a time during which the light emitting element is turned on is prolonged, and the delay signal is level shifted with a variable level shift amount by the level shift circuit thereby adjusting a time during which the delay signal is active.

Therefore, it is possible to adjust the time during which the delay signal is active, in accordance with a delay time of each light emitting element, by externally varying the shift amount of the level shift circuit from the outside of the circuit, for example, by adjusting the current of the constant current source of the level shift circuit. With this arrangement, it is possible to externally optimize the duty ratio of the output light from the outside of the circuit, and to increase the compensation amount of the distortion of the pulse width. Moreover, the delay circuit does not requires such a large time constant. Thus, for realizing the delay circuit that is a low pass filter, it is not necessary to externally mount a capacitance to the driving circuit. Thereby, the delay circuit have a low susceptibility to disturbance noise. Further, it is possible to suppress jitter that depends on signal frequencies. Therefore, this arrangement realizes high-speed optical transmission and optical recording/reproduction at a low cost, especially even if the light emitting element is a light emitting diode having a large distortion of the pulse width.

The driving circuit for the light emitting element of the present invention may be so arranged that the input signal is a differential signal being composed of a pair of signals, and the arithmetic circuit includes an OR circuit (13) and an AND circuit (14), and a comparison circuit (A4), the OR circuit receiving one of the signals, and one of outputs from the level shifting circuit, the AND circuit receiving the other of the signals and the other of the outputs from the level shifting circuit, the outputs from the level shifting circuit being obtained by level shifting the signals respectively, and the comparison circuit comparing an output from the OR circuit and an output from the AND circuit with each other.

With the above arrangement, in which the arithmetic circuit includes the OR circuit, the AND circuit, and the comparison circuit, the arithmetic circuit deals the signal as a differential signal. This makes the driving circuit suitable for the high-speed optical transmission and the optical recording/reproduction.

Further, the driving circuit for the light emitting element of the present invention may be so arranged that the level shift circuit includes a differential input transconductance amplifier, wherein the level shift amount is equal to a voltage of a product of a resistor and a current, which is externally adjustable from an outside of the circuit.

In the above arrangement, the level shift circuit is provided for both differential inputs of the arithmetic circuit, and has a variable level shift amount, and it is possible to arbitrarily set the sensitivity of the compensation of the distortion of the pulse width for the input signal by varying the transconductance by changing the value of the resistor RE.

Furthermore, a driving circuit for the light emitting element of the present invention may further includes a feedback circuit (the light receiving element PD, trans impedance amplifier A5, the average value circuit 22, and peak detection circuit 23) for controlling the level shift amount of the level shift circuit so that the output light and the input signal have an equal duty ratio.

With the above arrangement, it is possible to stably obtain the output light having the duty ratio equal to that of the input signal always.

Furthermore, the driving circuit for the light emitting element of the present invention may be so arranged that the light emitting element is a light emitting diode.

In the above arrangement, the present invention is effective, because the light emitting diode has an especially large delay in the light emission.

Moreover, an optical communication device of the present invention may be in conformity with IEEE1394, and use the aforementioned driving circuit for the light emitting element.

The above arrangement is effective a system (so called OP iLINK) in which, instead of a metal wire, an optical fiber is used as a transmission line, which a physical layer in conformity with IEEE1394-1995 and IEEE1394a-2000.

This invention being thus described, it will be obvious that the same may be varied in many ways. Such variations are not to be regarded as a departure from the spirit and scope of the invention, and all such modifications would be obvious to one skilled in the art intended to be included within the scope of the following claims.

What is claimed is:

1. A driving circuit for a light emitting element, comprising:
    a delay circuit for delaying an input signal;
    an arithmetic circuit for performing an OR operation of the input signal and a delay signal so as to obtain a signal of an OR logic, in order that the light emitting element is driven by using the signal of the OR logic so that an output light, which is emitted with a delay from the light emitting element, and the input signal have an equal duty ratio; and
    a level shift circuit, located between the delay circuit and the arithmetic circuit, for level shifting with a variable level shift amount, and adjusting a time during which a logic of the delay signal is kept.

2. The driving circuit for the light emitting element as set forth in claim 1, wherein:
    the input signal is a differential signal being composed of a pair of signals, and
    the arithmetic circuit includes an OR circuit, an AND circuit, and a comparison circuit, the OR circuit receiving one of the signals and one of outputs from the level shifting circuit, the AND circuit receiving the other of the signals and the other of the outputs from the level shifting circuit, the outputs from the level shifting circuit being obtained by level shifting the other of the signals, and the comparison circuit comparing an output from the OR circuit and an output from the AND circuit with each other.

3. The driving circuit for the light emitting element as set forth in claim 2, wherein:
    the level shift circuit includes a differential input transconductance amplifier, wherein the level shift amount is equal to a voltage of a product of a resistor and a current, which is externally adjustable from an outside of the circuit.

4. A driving circuit for a light emitting element as set forth in claim 1, further comprising:
    a feedback circuit for controlling the level shift amount of the level shift circuit so that the output light and the input signal have an equal duty ratio.

5. The driving circuit for the light emitting element as set forth in claim 1, wherein:
    the light emitting element is a light emitting diode.

6. An optical communication device in conformity with IEEE 1394 as set forth in claim 1, comprising:
    a driving circuit for a light emitting element, including:
        a delay circuit for delaying an input signal;
        an arithmetic circuit for performing an OR operation of the input signal and a delay signal so as to obtain a signal of an OR logic, in order that the light emitting element is driven by using the signal of the OR logic so that an output light, which is emitted with a delay from the light emitting element, and the input signal have an equal duty ratio; and a level shift circuit, located between the delay circuit and the arithmetic circuit, for level shifting with a variable level shift amount, and adjusting a time during which a logic of the delay signal is kept.

7. A driving circuit for a light emitting element, comprising:
   a delay circuit for delaying an input signal and outputting an output signal;
   a level shift circuit for level shifting the output signal of the delay circuit, and outputting an output signal; and
   a driving circuit for driving the light emitting element by using a signal of an OR logic obtained by an OR operation of the output signal of the level shift circuit and the input signal.

8. The driving circuit for driving the light emitting element as set forth in claim 7, wherein:
   the level shift circuit has a level shift amount that is externally adjustable.

9. A driving circuit for a light emitting element as set forth in claim 7, further comprising:
   a feedback circuit for detecting out a duty ratio of output light, which is emitted from the light emitting element, so as to obtain a detection result, and controlling a level shift amount of the level shift circuit in accordance with the detection result.

10. The driving circuit for the light emitting element as set forth in claim 7, wherein:
    the input signal is a differential signal, being composed of a positive-phase signal and an inversion signal, and
    the delay circuit and the level shift circuit are provided in each of a transmission route for the positive-phase signal of the input signal, and a transmission route for the inversion signal of the input signal,
    the driving circuit further comprising:
      an OR circuit for receiving the positive-phase signal of the input signal and the positive-phase signal that has been level shifted, and outputting an output;
      an AND circuit for receiving the inversion signal of the input signal and the inversion signal that has been level shifted, and outputting an output; and
      a comparison circuit for comparing the outputs of the OR circuit and the AND circuit.

11. The driving circuit for the light emitting element as set forth in claim 7, wherein:
    the input signal is a differential signal,
    the level shift circuit includes a resistor for level shifting, as much as a voltage equal to a product of a current flowing through the resistor, and a resistance of the resistor, a signal that is inputted into the resistor,
    the driving circuit for the light emitting element further comprising a transconductance amplifier for setting, in accordance with a control signal, the current flowing through the resistor.

12. The driving circuit for the light emitting element as set forth in claim 7, wherein:
    the delay circuit is a low-pass filter, and
    the low-pass filter and the level shift circuit is integrated in an integrated circuit.

* * * * *